United States Patent
Ushida et al.

(10) Patent No.: US 11,498,876 B2
(45) Date of Patent: Nov. 15, 2022

(54) CERAMIC POWDER

(71) Applicant: FUJIMI INCORPORATED, Kiyosu (JP)

(72) Inventors: Naoki Ushida, Kiyosu (JP); Yuji Masuda, Kiyosu (JP); Hirokazu Kumazawa, Kiyosu (JP); Mina Sato, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 113 days.

(21) Appl. No.: 17/036,303

(22) Filed: Sep. 29, 2020

(65) Prior Publication Data

US 2021/0094884 A1 Apr. 1, 2021

(30) Foreign Application Priority Data

Sep. 30, 2019 (JP) .............................. JP2019-179305

(51) Int. Cl.
*C04B 35/565* (2006.01)
*C04B 35/626* (2006.01)

(52) U.S. Cl.
CPC ...... *C04B 35/62655* (2013.01); *C04B 35/565* (2013.01); *C04B 2235/5436* (2013.01)

(58) Field of Classification Search
CPC ............................ C01B 32/956; C04B 35/565
See application file for complete search history.

(56) References Cited

U.S. PATENT DOCUMENTS

| | | | | |
|---|---|---|---|---|
| 2012/0295112 A1* | 11/2012 | Sasaki | .................. | C30B 35/007 428/402 |
| 2014/0331917 A1* | 11/2014 | Kim | ....................... | C30B 29/36 428/402 |
| 2015/0197871 A1* | 7/2015 | Min | .................. | C04B 35/62802 117/7 |
| 2015/0218005 A1* | 8/2015 | Kim | ....................... | C04B 35/565 428/402 |
| 2016/0137513 A1* | 5/2016 | Hase | ..................... | C01B 32/956 428/402 |

FOREIGN PATENT DOCUMENTS

JP 2011-241115 A 12/2011
JP 2018118874 A * 8/2018

* cited by examiner

*Primary Examiner* — Karl E Group
(74) *Attorney, Agent, or Firm* — Foley & Lardner LLP (57) ABSTRACT

The present disclosure provides a ceramic powder having low bulkiness and good dispersibility. In the ceramic powder, the volume ratio of aggregated particles having a particle diameter larger than a reference particle diameter is 35 vol. % or more and the volume ratio when ultrasonic dispersion treatment for 10 minutes at an oscillation frequency of 19.5 kHz and an output power of 10 W is applied is 4 vol. % or less. The reference particle diameter is a particle diameter equivalent to a cumulative 0.1 vol. % diameter from the large diameter side when the ceramic powder is subjected to ultrasonic dispersion treatment for 3 minutes at an oscillation frequency of 19.5 kHz and an output power of 150 W.

2 Claims, 7 Drawing Sheets

CERAMIC POWDER

BACKGROUND OF THE INVENTION

Field of the Invention

The present invention relates to a ceramic powder.

Description of the Related Art

For example, a silicon carbide (SiC) powder, such as green carbonite (GC), has been used as a filler of a molded grindstone and a high heat-conductive complex and the like utilizing the high hardness, the high heat conductivity, the high heat resistance, and the like thereof. In such a case, the silicon carbide powder is mixed with matrices of polyvinyl alcohol (POVAL), a phenolic resin, and an epoxy resin, binders of methyl cellulose and the like, various kinds of molding assistants, and the like, and then subjected to various treatment, such as polymerization, pressurization, and heating, to be used as a viscous varnish, a film, various structures, and the like. Moreover, the silicon carbide powder has also been used as a wire saw for cutting various ingots of silicon and quartz and a free grindstone for wafer lapping.

In such a silicon carbide powder, when the particle diameter decreases (10 μm or less), a possibility that particles are aggregated increases. Therefore, the aggregation is prevented by adding fine particles of metal oxides or silicon carbides to the silicon carbide powder, for example (for example, see PTL 1 described below).

CITATION LIST

Patent Literature

PTL 1: JP 2011-241115 A

SUMMARY OF THE INVENTION

However, in the silicon carbide powder described in PTL 1, the aggregation is prevented, and therefore there has been a possibility that the bulkiness of the powder increases, which causes a reduction in the handling properties of the powder, specifically a reduction in the fluidity of the powder, a reduction in the packing amount of the powder in a container, and the like.

Such problems may have similarly occurred as described above in a case of various kinds of ceramic powders used for a filler and the like without being limited to the silicon carbide powder, such as GC.

In view of such circumstances, it is an object of the present invention to provide a ceramic powder having low bulkiness and good dispersibility.

In order to solve the above-described problems, the present invention is a ceramic powder, in which the volume ratio of aggregated particles having a particle diameter larger than a reference particle diameter is 35 vol. % or more and the volume ratio when ultrasonic dispersion treatment for 10 minutes at an oscillation frequency of 19.5 kHz and an output power of 10 W is applied is 4 vol. % or less.

The ceramic powder according to the present invention can suppress an increase in the bulkiness of the powder because the ceramic powder contains a predetermined amount of the aggregated particles having a particle diameter larger than the reference particle diameter. Moreover, the aggregated particles can be dispersed by relatively weak force of the ultrasonic dispersion treatment for 10 minutes at an oscillation frequency of 19.5 kHz and an output power of 10 W, and therefore granular material dispersion treatment before kneading can be easily performed, for example.

DESCRIPTION OF THE PREFERRED EMBODIMENTS

Embodiments of a ceramic powder according to the present invention are described based on the drawings but the present invention is not limited only to the following embodiments described based on the drawings.

Main Embodiment

A main embodiment of the ceramic powder according to the present invention is described below based on FIGS. 1 to 11.

The ceramic powder according to this embodiment is a silicon carbide (SiC) powder, such as green carbonite (GC), for example, in which the volume ratio of aggregated particles (aggregated particle ratio Rf) having a particle diameter Dm larger than a reference particle diameter Ds is 35 vol. % or more and the volume ratio (aggregated particle ratio Rf) when ultrasonic dispersion treatment for 10 minutes at an oscillation frequency of 19.5 kHz and an output power of 10 W is applied is 4 vol. % or less.

Herein, the reference particle diameter Ds is a particle diameter equivalent to a cumulative 0.1 vol. % diameter from the large diameter side when the silicon carbide powder is subjected to ultrasonic dispersion treatment (homogenizer treatment) for 3 minutes at an oscillation frequency of 19.5 kHz and an output power of 150 W, i.e., diameter size of the coarsest (largest) particle after complete dispersion by the homogenizer treatment, and is usually a size of 0.1 μm or more and 10 μm or less.

The silicon carbide powder can be basically obtained by pulverizing a raw material synthesized by an industrially used "Acheson method" such that the average particle diameter is 5 μm or less, classifying the pulverized raw materials such that the average particle diameter of the particle size distribution is 1 μm or less, performing alkaline cleaning and acid cleaning for removing impurities, such as Fe or Al, for refining, followed by water cleaning, performing drying for removing the moisture, and then passing the resultant substance through a screen having an opening of 1 mm or less while disintegrating a mass, for example.

At this time, as a result of extensive studies by the present inventors, the present inventors have found that the dispersibility can be improved while suppressing an increase in the bulkiness of the powder by adjusting the water cleaning conditions or drying conditions to suppress the formation of firm aggregated particles due to solid bridging force or liquid bridging adhesive force described later and by forming aggregated particles by relatively weak electrostatic adhesive force and intentionally blending a predetermined amount of the aggregated particles. Thus, the present inventors have completed the present invention.

Specifically, the powder is mentioned in which the volume ratio of the aggregated particles (aggregated particle ratio Rf) having the particle diameter Dm larger than the reference particle diameter Ds is 35 vol. % or more and the volume ratio (aggregated particle ratio Rf) when the ultrasonic dispersion treatment for 10 minutes at an oscillation frequency of 19.5 kHz and an output power of 10 W is applied is 4 vol. % or less as described above. In such a silicon carbide powder according to this embodiment, the bulkiness is low and the dispersibility is good, and therefore granular material dispersion treatment before kneading can be easily performed by relatively weak force, for example.

Figure 6A:
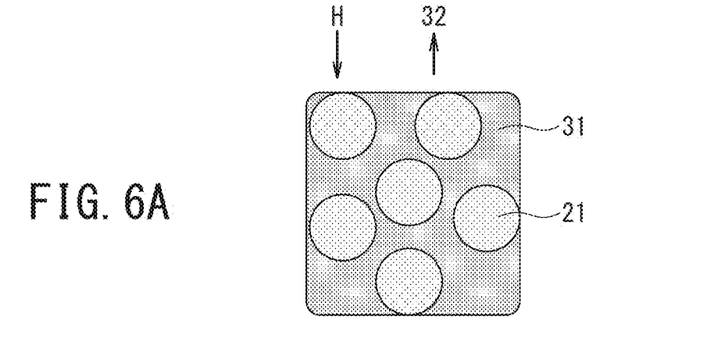
FIGS. 6A to 6C are explanatory views of a drying mechanism of the ceramic powder.
Figure 6B:
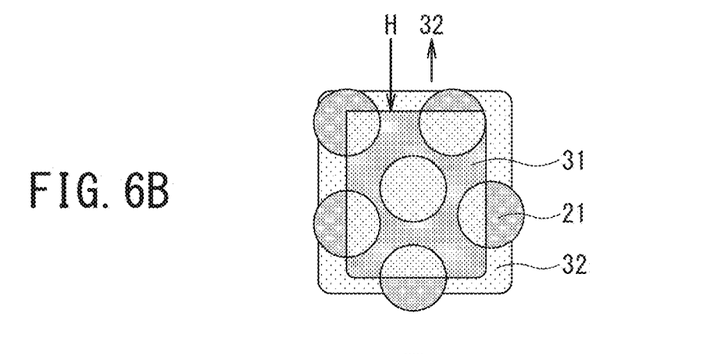
Figure 6C:
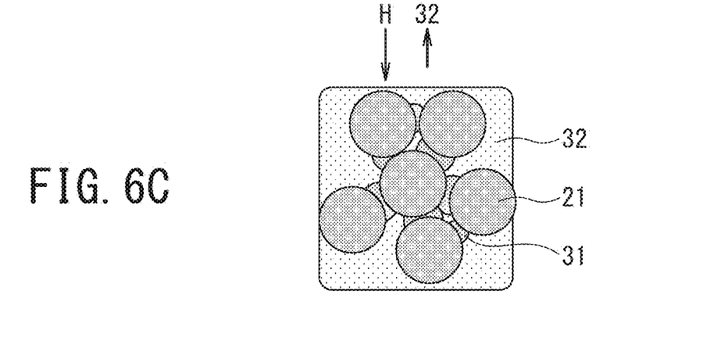

The above matter is described in more detail. FIGS. 6A to 6C are explanatory views about the drying mechanism of the ceramic powder.

As illustrated in FIG. 6A, when heat H is applied to particles 21 soaked in water 31, the water 31 first starts to evaporate in the vicinity of the surfaces of the particles 21. Then, as illustrated in FIG. 6B, the vicinity of the surfaces of the particles 21 forms a water vapor 32, the surface of the water 31 moves back in such a manner as to enter between the particles 21, and then the surface temperature of the particles 21 increases. Further, as illustrated in FIG. 6C, the water vapor 32 is also formed between the particles 21, so that the particles 21 are aggregated.

At this time, "solid bridging" (see FIG. 7) in which dissolved ions (metal ions of Na, Mg, and Ca) 41 in the water 31 are crystallized to the surfaces of the particles 21 in the form of deposited ions 42 with the evaporation of the water 31 to bridge the particles 21 and "liquid bridging adhesion" (see FIG. 8) in which the particles 21 are attracted to each other with a reduction in the water 31 caused by the evaporation, and then the water 31 present in a very small amount between the particles 21 bridges the particles 21 mainly act between the particles 21, so that the particles 21 are firmly aggregated.

Figure 7:
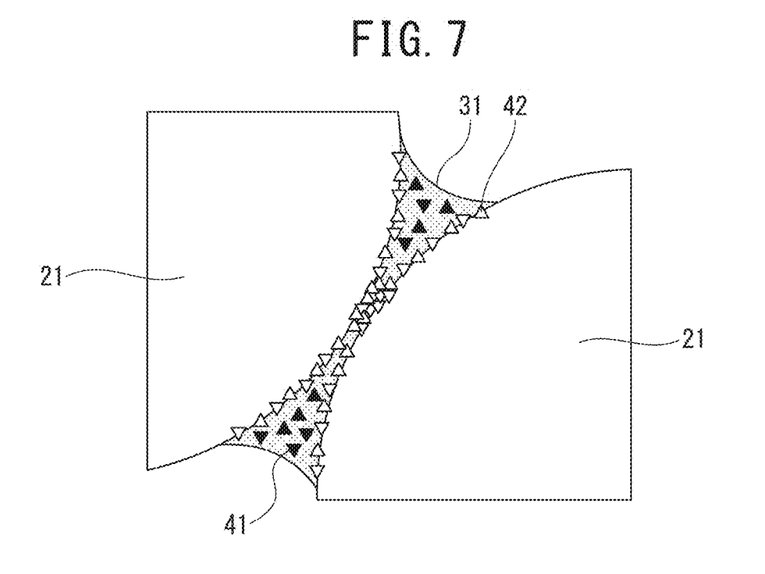
FIG. 7 is an explanatory view of solid bridging occurring in drying of the ceramic powder.
Figure 8:
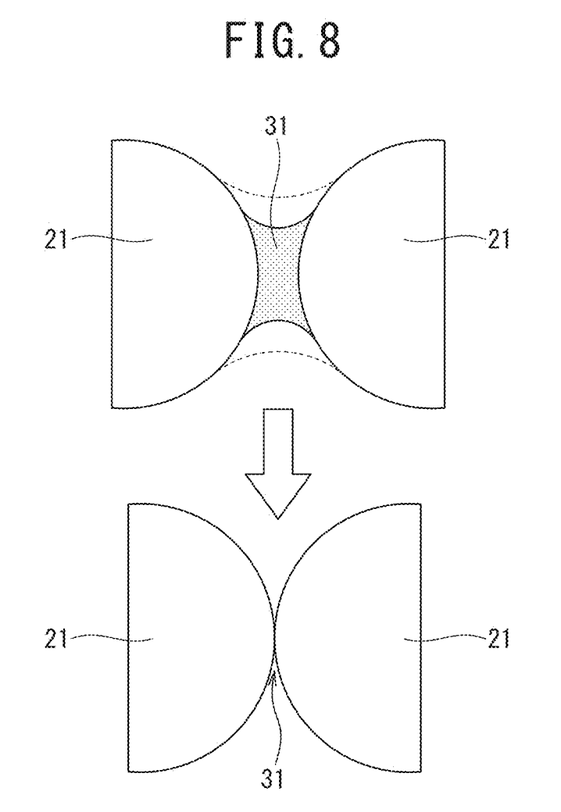
FIG. 8 is an explanatory view of liquid bridging adhesion occurring in drying of the ceramic powder.

Thus, the present inventors have repeated extensive examinations. As a result, the present inventors have found that a ceramic powder which has low bulkiness and can be easily re-dispersed is obtained by suppressing the formation of the firm aggregated particles by first reducing the dissolved ions 41 in the water 31 used for the cleaning as much as possible, specifically reduced to 10 ppm or less, to reduce the generation of the deposited ions 42, thereby greatly suppressing the "solid bridging force" and further adjusting at least one of the distance between the particles 21 and the moisture amount (humidity) in the atmosphere in drying, thereby adjusting the "liquid bridging adhesive force" and by forming aggregated particles by relatively weak force and intentionally blending a predetermined amount of the aggregated particles.

Examples of drying methods capable of adjusting the liquid bridging adhesive force include vacuum stirring and drying, spray drying, spray flash drying, vacuum freeze drying, and the like.

Figure 1:
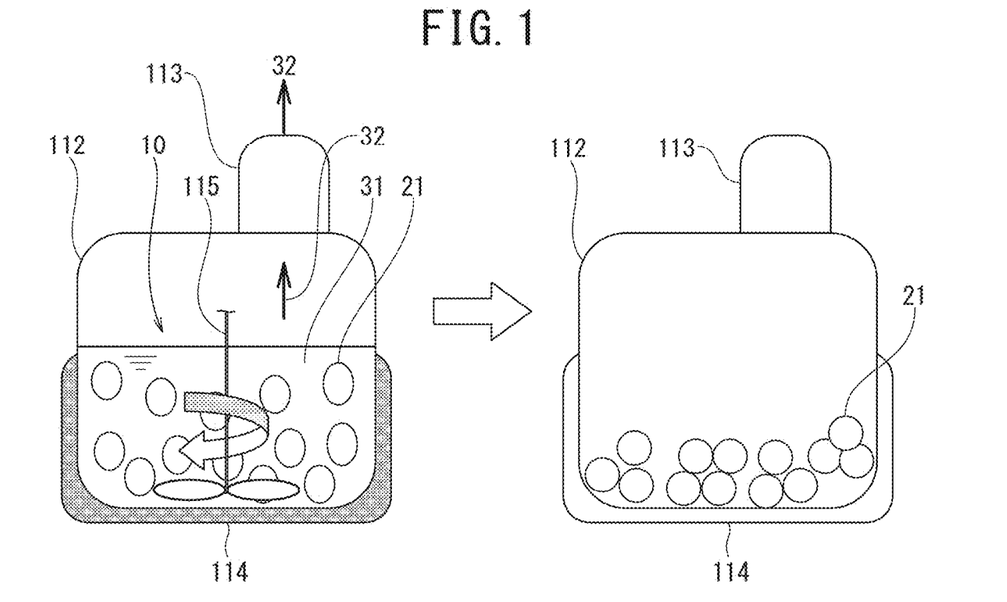
FIG. 1 is an explanatory view of vacuum stirring and drying in a main embodiment of a ceramic powder according to the present invention.

The vacuum stirring and drying is a drying method capable of adjusting the ambient humidity and the particle distance by placing the particles 21 (slurry 10) soaked in the water 31 in a drying apparatus 112, and then supplying steam into a jacket 114 for heating while making the slurry 10 in the apparatus 112 flow by directly stirring the slurry 10 by a stirrer 115, such as an agitator, a chopper, or a stirring blade, during the evacuation of the apparatus 112 with a vacuum pump or the like from an exhaust pipe 113 as illustrated in FIG. 1. The direct stirring at this time more effectively acts on the disintegration of particles aggregated during the drying than vacuum fluidized bed drying.

Figure 2:
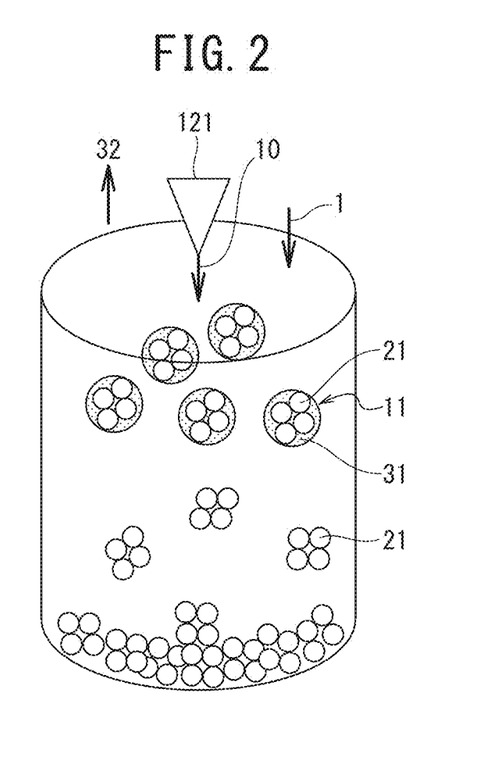
FIG. 2 is an explanatory view of spray drying in the main embodiment of the ceramic powder according to the present invention.

The spray drying is a drying method capable of adjusting the particle distance by spraying the slurry 10 from a nozzle 121, and then heating and drying sprayed single micronsized liquid droplets 11 (micromist) with hot air 1 as illustrated in FIG. 2.

Figure 9:
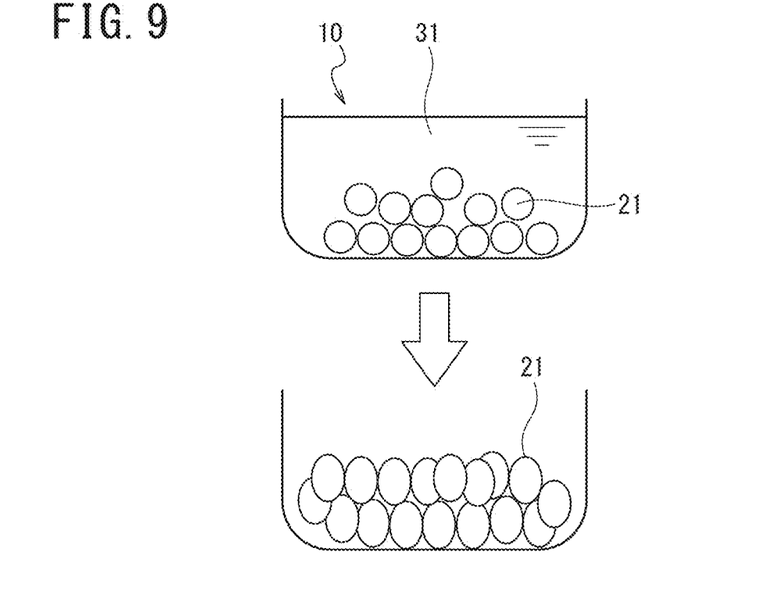
FIG. 9 is an explanatory view of a state when a slurry is totally dried.
Figure 10:
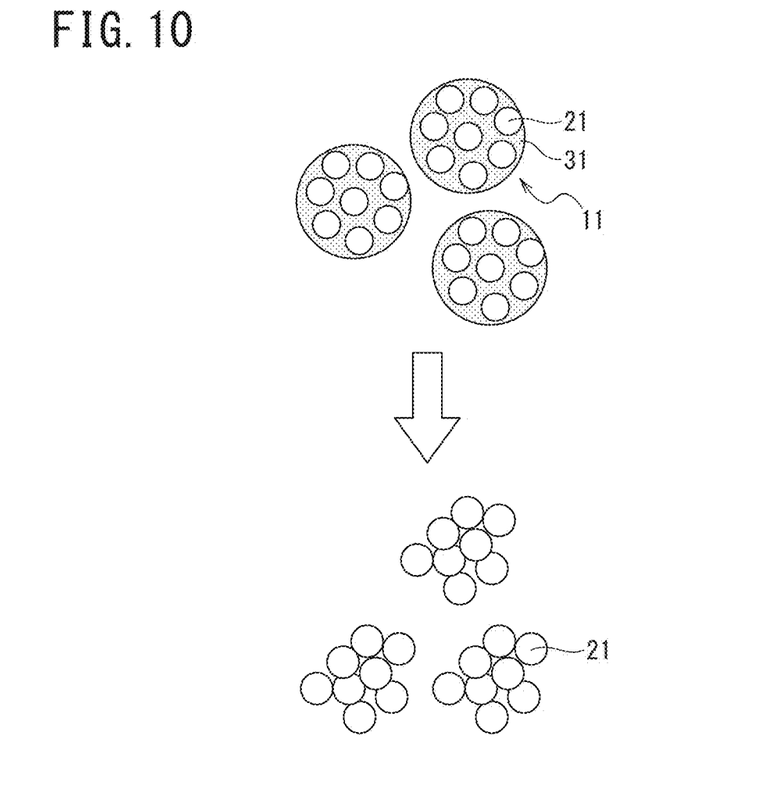
FIG. 10 is an explanatory view of a state when the slurry is formed into liquid droplets and dried.
Figure 11:
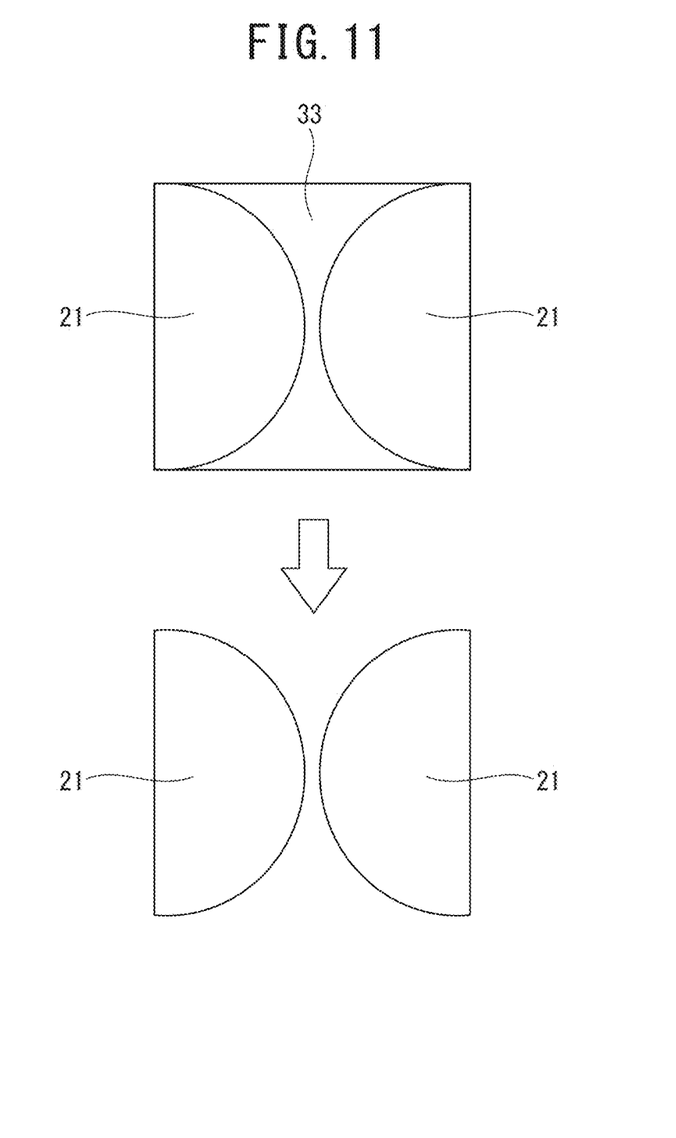
FIG. 11 is an explanatory view of a state when the slurry is dried by sublimation.

This spray drying is very preferable because the slurry 10 is formed into the liquid droplets 11 and dried, and therefore the distance between the particles 21 can be relatively made large, so that the aggregation size can be reduced (see FIG. 10), whereas, when the slurry 10 is totally dried as with the radiation heat transfer drying, for example, the distance between the particles 21 is relatively short, so that the aggregation size is likely to increase (see FIG. 9).

Figure 3:
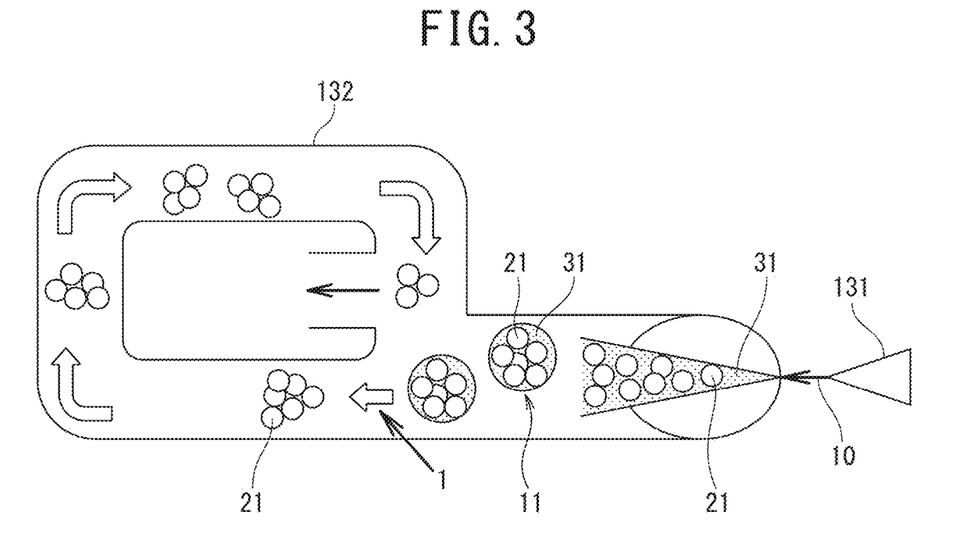
FIG. 3 is an explanatory view of spray flash drying in the main embodiment of the ceramic powder according to the present invention.

The spray flash drying (jet turbo dryer) is a drying method capable of adjusting the particle distance by spray-supplying the slurry 10 into the hot air 1 from a nozzle 131, and then heating and drying the slurry 10 while conveying the slurry 10 by air flow in a circulating drying chamber 132 as illustrated in FIG. 3.

This spray flash drying is also very preferable because the slurry 10 is dried after being dispersed and formed into the liquid droplets 11 as with the spray drying described above, and therefore the distance between the particles 21 can be relatively made large, so that the aggregation size can be reduced and the air flow conveyance more effectively acts on the disintegration of particles aggregated during the drying than the vacuum fluidized bed drying.

Figure 4:
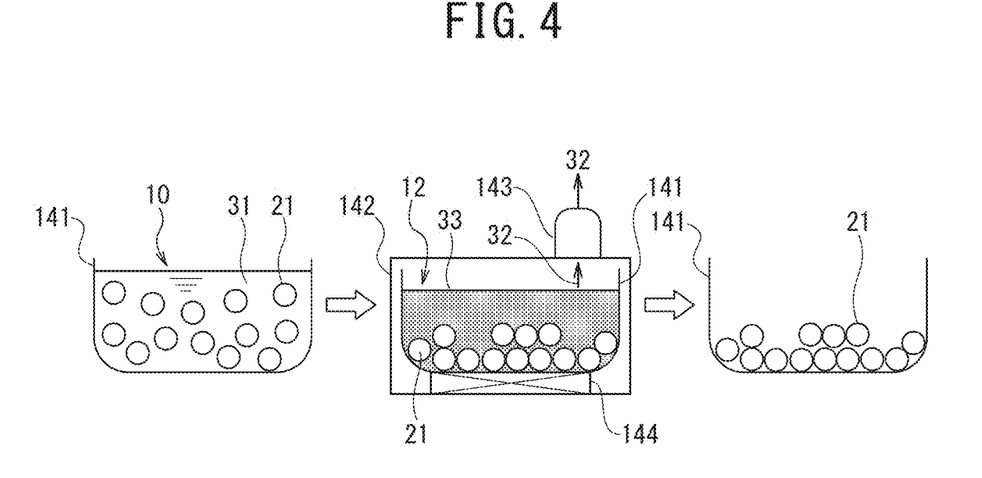
FIG. 4 is an explanatory view of vacuum freeze drying in the main embodiment of the ceramic powder according to the present invention.

The vacuum freeze drying (freeze drying) is a drying method capable of adjusting the particle distance by placing the slurry 10 in a container 141, disposing a solidified body 12 obtained by freezing the slurry 10 with a freezing apparatus or the like to solidify the slurry 10 into an ice 33 in a dryer 142, and then heating the solidified body 12 with a heater 144 while evacuating the dryer 142 to a substantially vacuum state (100 Pa or less) with a vacuum pump or the like from an exhaust pipe 143 to sublimate the ice 33 into the water vapor 32 and discharge the same as illustrated in FIG. 4. The discharged water vapor 32 is cooled with a cold trap to be collected as the ice 33 again.

The vacuum freeze drying is very preferable because the moisture removal is performed by the sublimation from the ice 33 in the form of a solid into the water vapor 32 in the form of gas (see FIG. 11), i.e., not passing through the water 31 in the form of liquid, and therefore the approach between the particles 21 with a reduction in the water 31 in the form of liquid can be prevented and the distance between the particles 21 can be relatively made large, so that the aggregation size can be reduced.

In the silicon carbide powder according to this embodiment thus obtained, the aggregated particle ratio Rf is 35 vol. % or more and the aggregated particle ratio Rf when ultrasonic dispersion treatment for 10 minutes at an oscillation frequency of 19.5 kHz and an output power of 10 W is applied is 4 vol. % or less, and thus the bulkiness is low and the dispersibility is good as described above.

Other Embodiments

The embodiment described above describes the case of the silicon carbide powder, such as GC. However, the present invention is not limited thereto and can be similarly applied as described in the embodiment above in a case of various kinds of ceramic powders (for example, $Al_2O_3$ (alumina), $SiO_2$ (silica), AlN, BN, BeO, and the like) used for a filler and the like.

EXAMPLES

Examples of the ceramic powder according to the present invention are described but the present invention is not limited only to Examples described below.
[Production of Test Bodies and Comparison Bodies]

Example 1

Vacuum Stirring and Drying

<<Raw Material>>
A raw material of a silicon carbide powder (average particle diameter: about 10 to 20 μm) synthesized by the "Acheson method" was prepared.
<<Pulverization Step>>
The raw material of the silicon carbide powder is finely pulverized in a ball mill by a wet process such that the average particle diameter is 5 μm or less.
<<Classification Step>>
The finely pulverized silicon carbide powder is classified by elutriation to have a particle size distribution with an average particle diameter of 1 μm or less.
<<Refining Step>>
The silicon carbide powder was refined by immersing the classified silicon carbide powder in an aqueous solution having a pH of 10 or more for 1 hour or more for alkaline cleaning and immersing the silicon carbide powder in an aqueous solution having a pH of 2 or less for 1 hour or more for acid cleaning.
<<Water Cleaning Step>>
The refined silicon carbide powder was water-cleaned by performing cross flow filtration to the silicon carbide powder using water A with a small number of dissolved ions (metal ions of Na, Mg, and Ca) (dissolved ion content: 6.4 ppm), and then performing the replacement with water having an amount equal to the amount of the flowing-out water.
<<Drying Step>>
The water-cleaned silicon carbide powder was heated for 4 hours or more to be dried by the vacuum stirring and drying described above (drying temperature: 70° C. or more, degree of vacuum: 10 kPa or less, number of rotations of agitator: 100 rpm or more, number of rotations of chopper: 600 rpm or more).

<<Disintegration Step>>
The dried silicon carbide powder was passed through a screen having an opening of 1 mm or less while disintegrating the silicon carbide powder with a pin mill, so that a silicon carbide powder test body 1 was obtained.

Example 2

Spray Drying

In the drying step of Example 1, the spray drying described above (drying temperature: 200° C. or more, air pressure: 0.6 MPa or more, liquid supply amount: 5 mL/m or more) was applied in place of the vacuum stirring and drying and the disintegration step was omitted. A silicon carbide powder test body 2 was obtained by performing treatment under the same conditions as those of Example 1, except the above.

Example 3

Spray Flash Drying

In the drying step of Example 1, the spray flash drying described above (drying temperature: 180° C. or more, air pressure: 0.4 MPa or more, liquid supply amount: 50 mL/m or more) was applied in place of the vacuum stirring and drying and the disintegration step was omitted. A silicon carbide powder test body 3 was obtained by performing treatment under the same conditions as those of Example 1, except the above.

Example 4

Vacuum Freeze Drying

In the drying step of Example 1, the vacuum freeze drying described above (drying temperature: 60° C. or less, degree of vacuum: 100 Pa or less, water vapor recovery (cold trap) temperature: −40° C. or less) was applied in place of the vacuum stirring and drying. A silicon carbide powder test body 4 was obtained by performing treatment under the same conditions as those of Example 1, except the above.

Comparative Example 1

Radiation Heat Transfer Drying (1)

Figure 5:
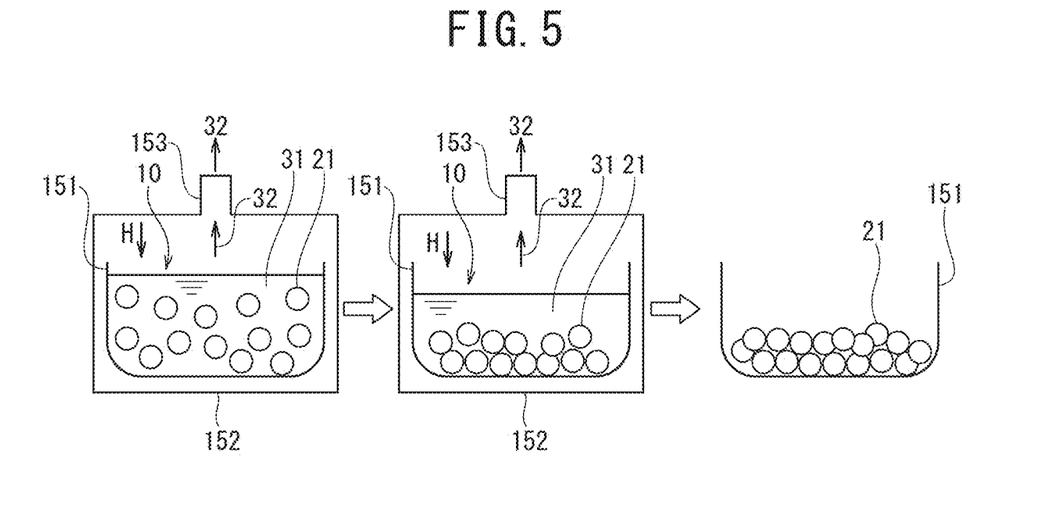
FIG. 5 is an explanatory view of radiation heat transfer drying in Comparative Examples of the ceramic powder according to the present invention.

In the drying step of Example 1, radiation heat transfer drying (drying temperature: 200° C. or more) was applied in place of the vacuum stirring and drying. As illustrated in FIG. 5, this radiation heat transfer drying (shelf type drying apparatus) is a method of performing drying by placing the slurry 10 in a container 151 and disposing the same in a drying furnace 152, applying heat H by radiation from an electric heater or the like to the inside of the drying furnace 152, and then discharging the generated water vapor 32 from an exhaust duct 153 of the drying furnace 152 to the outside. A silicon carbide powder comparison body 1 was obtained by performing treatment under the same conditions as those of Example 1, except the above.

Comparative Example 2

Radiation Heat Transfer Drying (2)

In Comparative Example 1, water B with a large number of dissolved ions (metal ions of Na, Mg, and Ca) (dissolved ion content: 61.1 ppm) was used in place of the water A used in the water cleaning step. A silicon carbide powder comparison body 2 was obtained by performing treatment under the same conditions as those of Comparative Example 1, except the above.

<Dissolved Ion Concentration in Water>

Herein, the measurement results of the dissolved ion concentrations of the water A used in Examples 1 to 4 and Comparative Example 1 and the water B used in Comparative Example 2 are illustrated in Table 1 illustrated below. The measurement of the dissolved ion concentration was performed by ICP optical emission spectroscopy using "ICPS-8100 (Trade Name) manufactured by Shimadzu Corporation by fractionating 3 g of a sample from each of the water A and B, adding 0.5 mL of nitric acid (grade: for atomic absorption analysis, concentration: 60.0%) and about 30 mL of ultrapure water to each sample, heating the mixture until a vapor was generated, and then adding ultrapure water to each sample such that the amount was 50 g to prepare measurement samples.

TABLE 1

| Metal ion | Water A (ppm) | Water B (ppm) |
|---|---|---|
| Na | 1.5 | 23.1 |
| Mg | 0.4 | 4.2 |
| Ca | 4.5 | 33.8 |

As is understood from Table 1, it was confirmed that the content of the metal ions of Na, Mg, and Ca is much lower and the dissolved ion concentration is much lower in the water A than in the water B.

[Test Contents]

<Reference Particle Diameter Ds>

The test bodies 1 to 4 and the comparison bodies 1 and 2 were individually determined for the reference particle diameter Ds by being subjected to homogenizer treatment and measuring the particle diameter distribution. The results are illustrated in Tables 2 and 3. The homogenizer treatment performed perfect dispersion by performing the treatment for 3 minutes at an oscillation frequency of 19.5 kHz and an output power of 150 W using "US-150T (Trade Name)" manufactured by NISSEI Corporation. As the particle diameter distribution, the relation between the particle diameter (μm) and the volume frequency (vol. %) was determined using a laser diffraction type measuring instrument "MT-3300EX II (Trade Name)" manufactured by MictotracBEL Corp.

<Aggregated Particle Ratio Rf>

The particle diameter distributions before and after the application of the ultrasonic dispersion treatment to the test bodies 1 to 4 and the comparison bodies 1 and 2 were individually measured. Then, the volume ratio of the aggregated particles (aggregated particle ratio Rf) having the particle diameter Dm (>Ds) larger than the reference particle diameter Ds was determined for each of the test bodies 1 to 4 and the comparison bodies 1 and 2. The results are illustrated in Tables 2 and 3. The ultrasonic dispersion treatment performed simple dispersion by performing the treatment for 10 minutes at an oscillation frequency of 19.5 kHz and an output power of 10 W using a laser diffraction measuring instrument "MT-3300EX II (Trade Name)" manufactured by MictotracBEL Corp. The particle diameter distribution was determined in the same manner as above.

<Bulkiness>

The test bodies 1 to 4 and the comparison bodies 1 and 2 were individually placed in a beaker. Then, the bulkiness was visually evaluated and determined from the aggregated particle ratio Rf before the ultrasonic dispersion treatment of each of the test bodies 1 to 4 and the comparison bodies 1 and 2. The results are illustrated in Table 2 illustrated below. The determination criteria were as follows: a case where the aggregated particle ratio Rf was 75 vol. % or more, and thus the bulkiness was low and the handling properties were excellent was evaluated as "Good", a case where the aggregated particle ratio Rf was 35 vol. % or more and less than 75 vol. %, and thus the bulkiness was not so high and no problems occurred in the handling properties was evaluated as "Fair", and a case where the aggregated particle ratio Rf was less than 35 vol. %, and thus the bulkiness was high and difficulties seemed to arise in the handling properties was evaluated as "Poor".

<Dispersibility>

The dispersibility was determined from the aggregated particle ratio Rf after the ultrasonic dispersion treatment of each of the test bodies 1 to 4 and the comparison bodies 1 and 2. The results are illustrated in Table 3. The determination criteria were as follows: a case where the aggregated particle ratio Rf was 1 vol. % or less was evaluated as "Excellent", a case where the aggregated particle ratio Rf was more than 1 vol. % and 4 vol. % or less was evaluated as "Good", and a case where the aggregated particle ratio Rf was more than 4 vol. % was evaluated as "Poor".

[Test Results]

The results of the tests described above are illustrated in Tables 2 and 3 illustrated below. In Tables 2 and 3, "D0.1" is a particle diameter at a cumulative 0.1 vol. % from the large diameter side of the volume-basis cumulative particle size distribution, "D50" is a median diameter, and "D94" is a particle diameter at a cumulative 94 vol. % from the large diameter side of the volume-basis cumulative particle size distribution.

TABLE 2

| | | | | Before ultrasonic dispersion treatment | | | | |
|---|---|---|---|---|---|---|---|---|
| | Cleaning water | Drying method | Reference particle diameter (μm) | Aggregated particle ratio (vol. %) | D0.1 | D50 (μm) | D94 | Bulkiness |
| Test body 1 | Water A | Vacuum stirring | 1.2 | 98.98 | 332.7 | 156.2 | 43.72 | Good |
| Test body 2 | Water A | Spraying | 1.2 | 90.64 | 54.77 | 5.7 | 0.974 | Good |
| Test body 3 | Water A | Spray flash | 1.2 | 38.87 | 58.73 | 0.8 | 0.207 | Fair |
| Test body 4 | Water A | Freezing | 1.2 | 77.61 | 198 | 20 | 0.515 | Good |
| Comparison body 1 | Water A | Radiation heat transfer | 1.2 | 93.51 | 228.9 | 45.87 | 0.794 | Good |

TABLE 2-continued

| | Cleaning water | Drying method | Reference particle diameter (μm) | Before ultrasonic dispersion treatment | | | | |
| --- | --- | --- | --- | --- | --- | --- | --- | --- |
| | | | | Aggregated particle ratio (vol. %) | D0.1 | D50 (μm) | D94 | Bulk-iness |
| Comparison body 2 | Water B | Radiation heat transfer | 1.2 | 92.55 | 200.7 | 41.43 | 0.613 | Good |

As is understood from Table 2, the reference particle diameter Ds was 1.2 μm in all the test bodies 1 to 4. In the test bodies 1, 2, and 4, it was able to be confirmed that the aggregated particle ratio Rf before the ultrasonic dispersion treatment was 75 vol. % or more, which greatly exceeded 35 vol. %, and thus the bulkiness was able to be reduced and the handling properties were excellent. In the test body 3 (spray flash drying), it was able to be confirmed that a disintegration effect accompanying the air flow conveyance was high and the aggregated particle ratio Rf was 38.87 vol. %, which was close to 35 vol. %, and therefore the bulkiness was relatively high but the bulkiness caused no problems in the handling properties.

Also in the comparison bodies 1 and 2, the reference particle diameter Ds was 1.2 μm and the aggregated particle ratio Rf before the ultrasonic dispersion treatment was 92 to 93 vol. %, and thus the bulkiness was low and the handling properties were excellent as with the test bodies 1 to 4. Hence, all the test bodies 1 to 4 and the comparison bodies 1 and 2 had no difficulties in the handling properties due to high bulkiness.

TABLE 3

| | Cleaning water | Drying method | Reference particle diameter (μm) | After ultrasonic dispersion treatment | | | | |
| --- | --- | --- | --- | --- | --- | --- | --- | --- |
| | | | | Aggregated particle ratio (vol. %) | D0.1 | D50 (μm) | D94 | Dis-persibility |
| Test body 1 | Water A | Vacuum stirring | 1.2 | 1.89 | 3.055 | 0.267 | 0.146 | Good |
| Test body 2 | Water A | Spraying | 1.2 | 2.47 | 3.055 | 0.281 | 0.149 | Good |
| Test body 3 | Water A | Spray flash | 1.2 | 1.88 | 2.937 | 0.241 | 0.098 | Good |
| Test body 4 | Water A | Freezing | 1.2 | 0 | 1.28 | 0.265 | 0.146 | Excellent |
| Comparison body 1 | Water A | Radiation heat transfer | 1.2 | 5.07 | 8.625 | 0.233 | 0.083 | Poor |
| Comparison body 2 | Water B | Radiation heat transfer | 1.2 | 18.04 | 28.8 | 0.36 | 0.181 | Poor |

As is understood from Table 3, it was able to be confirmed that the aggregated particle ratio Rf after the ultrasonic dispersion treatment was 4 vol. % or less in all the test bodies 1 to 4, and thus all the test bodies 1 to 4 had good dispersibility. Particularly in the test body 4 (freeze drying), the aggregated particle ratio Rf was 0 vol. %, and thus extremely excellent dispersibility was exhibited. In contrast thereto, in the comparison bodies 1 and 2, the aggregated particle ratio Rf exceeded 4 vol. %. Particularly in the comparison body 2, the aggregated particle ratio Rf exceeded 10 vol. %, and thus the dispersibility was poor.

From the above results, it was accepted that the test bodies 1 to 4 had low bulkiness and good dispersibility.

INDUSTRIAL AVAILABILITY

The ceramic powder according to the present invention has low bulkiness and good dispersibility, and therefore granular material dispersion treatment before kneading can be easily performed by relatively weak force, for example, and thus the ceramic powder according to the present invention can be extremely industrially usefully used.

DESCRIPTION OF REFERENCE NUMERALS 1 hot air
10 slurry
11 liquid droplet
12 solidified body
21 particle
31 water
32 water vapor
33 ice
41 dissolved ion
42 deposited ion
112 drying apparatus
113 exhaust pipe
114 jacket
115 stirrer
121 nozzle
131 nozzle
132 drying chamber
141 container
142 dryer
143 exhaust pipe
144 heater
151 container
152 drying furnace
153 exhaust duct

What is claimed is:
1. A silicon carbide (SiC) powder, wherein:

a volume ratio of aggregated particles having a particle diameter larger than a reference particle diameter is 35 vol. % or more;

the volume ratio when ultrasonic dispersion treatment for 10 minutes at an oscillation frequency of 19.5 kHz and an output power of 10 W is applied is 4 vol. % or less; and the reference particle diameter is 0.1 µm or more and 10 µm or less.

2. The silicon carbide (SiC) powder according to claim 1, wherein the reference particle diameter is a particle diameter equivalent to a cumulative 0.1 vol. % diameter from a large diameter side when the ceramic powder is subjected to ultrasonic dispersion treatment for 3 minutes at an oscillation frequency of 19.5 kHz and an output power of 150 W.

* * * * *